US012771817B2

(12) United States Patent
Strandborg

(10) Patent No.: US 12,771,817 B2
(45) Date of Patent: Oct. 20, 2026

(54) LIGHT FIELD DISPLAY USING BIREFRINGEMENT MATERIALS AND METAMATERIALS

(71) Applicant: Distance Technologies Oy, Helsinki (FI)

(72) Inventor: Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 212 days.

(21) Appl. No.: 18/636,386

(22) Filed: Apr. 16, 2024

(65) Prior Publication Data

US 2025/0324024 A1 Oct. 16, 2025

(51) Int. Cl.

| | |
|---|---|
| ***H04N 13/32*** | (2018.01) |
| ***H04N 13/122*** | (2018.01) |
| ***H04N 13/346*** | (2018.01) |
| ***H04N 13/383*** | (2018.01) |

(52) U.S. Cl.

CPC ........... *H04N 13/32* (2018.05); *H04N 13/122* (2018.05); *H04N 13/346* (2018.05); *H04N 13/383* (2018.05)

(58) Field of Classification Search

CPC ........ G02B 2027/0134; G02B 27/0093; G02B 27/0172; H04N 13/122; H04N 13/32; H04N 13/346; H04N 13/383

USPC ........................................................... 348/51

See application file for complete search history.

(56) References Cited

U.S. PATENT DOCUMENTS

| | | | | |
|---|---|---|---|---|
| 2014/0139652 A1* | 5/2014 | Aiden | .................. | H04N 13/305 348/54 |
| 2021/0240036 A1 | 8/2021 | Jamali et al. | | |
| 2022/0321867 A1* | 10/2022 | Makinen | ................ | G02B 30/27 |
| 2023/0118979 A1 | 4/2023 | Mathur et al. | | |

OTHER PUBLICATIONS

European Patent Office, Extended European Search Report, Application No. 25167889.2-1001, Dated Sep. 17, 2025, 5 Pages.

* cited by examiner

*Primary Examiner* — Christopher S Kelley
*Assistant Examiner* — Ana Picon-Feliciano
(74) *Attorney, Agent, or Firm* — Ziegler IP Law Group, LLC.

(57) ABSTRACT

A first virtual image and a second virtual image are obtained, based on a relative location of a first eye and a second eye of at least one user with respect to an optical element. An image is generated, based on the first virtual image, the second virtual image, the relative location of the first eye and the second eye with respect to the optical element, and a relative location of the optical element with respect to a first display region and a second display region of a display unit. The image is displayed via the display unit. The optical element, being made of a birefringent material or a metamaterial, re-directs light emanating from the second display region to bend towards the first eye and the second eye, whilst allowing light emanating from the first display region to be incident upon the first eye and the second eye without bending.

20 Claims, 5 Drawing Sheets

LIGHT FIELD DISPLAY USING BIREFRINGEMENT MATERIALS AND METAMATERIALS

TECHNICAL FIELD

The present disclosure relates to systems incorporating light field display using birefringent materials and metamaterials. The present disclosure also relates to methods incorporating light field display using birefringent materials and metamaterials.

BACKGROUND

Robust autostereoscopy and multiscopy are largely unsolved problems. There exist various different types of autostereoscopic displays. However, existing autostereoscopic displays suffer from several drawbacks.

Firstly, crosstalk is a significant problem in existing autostereoscopic displays. Lenticular arrays or parallax barriers are conventionally used to direct light to different eyes of a user; however, an imperfect alignment or a poor design results in crosstalk. Crosstalk not only leads to a degradation in a three-dimensional (3D) visual scene presented to user(s), but also causes visual discomfort and reduces an overall quality of the users' viewing experience.

Secondly, low resolution poses significant challenges in existing autostereoscopic displays, impacting the quality of the 3D visual scene. When displaying virtual content on low-resolution autostereoscopic displays, aliasing artifacts and jagged edges may become even more noticeable, particularly in high-contrast or detailed visual scenes. This can greatly detract from a realism and immersiveness of the 3D visual scene.

Thirdly, low brightness levels can make it difficult for users to discern visual details and perceive colours, particularly in brightly lit environments or when viewing content with dark scenes. This can lead to eyestrain and reduced usability, as users may struggle to perceive the 3D visual scene.

Fourthly, narrow viewing angles is another significant challenge in existing autostereoscopic displays, impacting the overall user experience and usability. As a user moves away from an optimal viewing position, ghosting artifacts become pronounced, thereby causing discomfort.

Fifthly, due to a narrow field of view provided by the existing autostereoscopic displays, only a limited portion of the 3D visual scene may be visible in 3D, restricting a spatial coverage and immersiveness of the 3D visual scene. Moreover, a narrow field of view can create visual discontinuities, where objects or elements within the 3D visual scene abruptly transition between 3D and 2D as the user's perspective changes. This can be jarring and may disrupt a sense of continuity and realism in the user's viewing experience.

Therefore, in light of the foregoing discussion, there exists a need to overcome the aforementioned drawbacks.

SUMMARY

The present disclosure seeks to provide novel systems and novel methods for presenting, to one or more users, high-resolution and artefact-free virtual content via a synthetic light field at an optimal brightness and a wide field of view, as compared to the prior art. The aim of the present disclosure is achieved by systems and methods which incorporate light field display using birefringent materials and metamaterials, as defined in the appended independent claims to which reference is made to.

Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
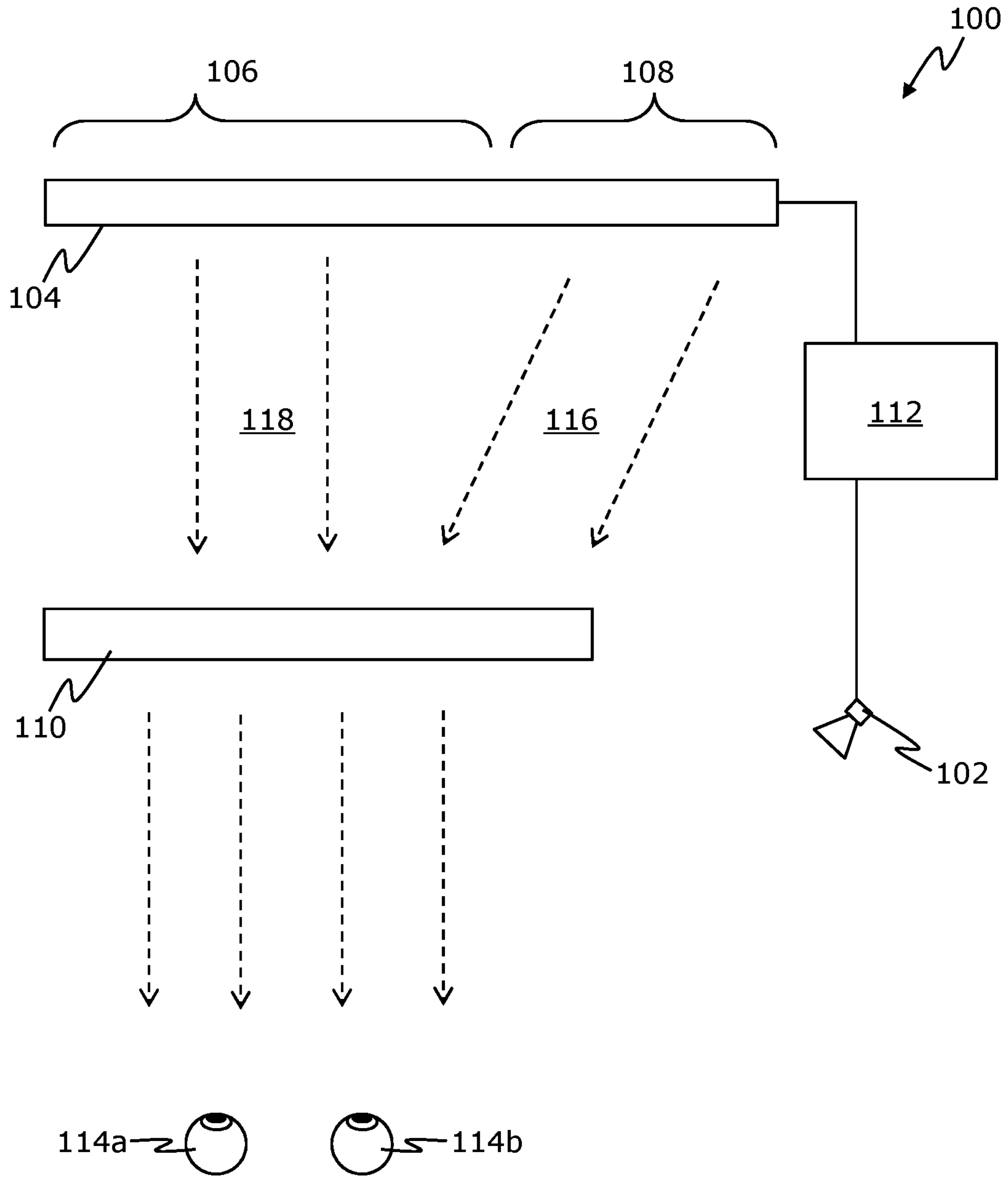
FIG. 1 depicts an example implementation of a system incorporating light field display using a birefringent material or a metamaterial, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

tracking means;

a display unit comprising a first display region and a second display region;

an optical element arranged on an optical path of the display unit, the optical element being made of any one of: (i) a birefringent material, (ii) a metamaterial; and at least one processor configured to:

- utilise the tracking means to determine a relative location of a first eye and of a second eye of at least one user with respect to the optical element;
- obtain a first virtual image and a second virtual image to be presented to the first eye and the second eye of the at least one user, respectively, based on the relative location of the first eye and of the second eye of the at least one user with respect to the optical element;
- generate at least one image to be employed at the display unit, based on the first virtual image, the second virtual image, the relative location of the first eye and of the second eye of the at least one user with respect to the optical element, and a relative location of the optical element with respect to the first display region and the second display region; and display the at least one image via the display unit, wherein the optical element is employed to re-direct light emanating from photo-emitting cells on the second display region to bend towards the first eye and the second eye of the at least one user, whilst allowing light emanating from photo-emitting cells on the first display region to be incident upon the first eye and the second eye of the at least one user without bending.

In a second aspect, an embodiment of the present disclosure provides a method comprising:

utilising tracking means to determine a relative location of a first eye and of a second eye of at least one user with respect to an optical element, the optical element being arranged on an optical path of a display unit comprising a first display region and a second display region, the optical element being made of any one of: (i) a birefringent material, (ii) a metamaterial;

obtaining a first virtual image and a second virtual image to be presented to the first eye and the second eye of the at least one user, respectively, based on the relative location of the first eye and of the second eye of the at least one user with respect to the optical element;

generating at least one image to be employed at the display unit, based on the first virtual image, the second virtual image, the relative location of the first eye and of the second eye of the at least one user with respect to the optical element, and a relative location of the optical element with respect to the first display region and the second display region; and displaying the at least one image via the display unit, wherein the optical element is employed to re-direct light emanating from photo-emitting cells on the second display region to bend towards the first eye and the second eye of the at least one user, whilst allowing light emanating from photo-emitting cells on the first display region to be incident upon the first eye and the second eye of the at least one user without bending.

The present disclosure provides the aforementioned system and the aforementioned method incorporating light field display using birefringent materials or metamaterials. Such a novel system and method are susceptible to be utilised for presenting, to one or more users, high-resolution and artefact-free virtual content via a synthetic light field at an optimal brightness and a wide field of view, as compared to the prior art. Being made of any one of: (i) the birefringent material, (ii) the metamaterial, the optical element allows almost all the light incident thereupon to pass through towards the user. This allows the system to eliminate the problem of low brightness levels, which is encountered in conventional autostereoscopic displays. Moreover, the at least one image is generated precisely and accurately based on the relative location of the first eye and of the second eye of the at least one user with respect to the optical element, and the relative location of the optical element with respect to the first display region and the second display region. This allows the system to not only eliminate the problem of crosstalk, but also widen viewing angles from which the at least one user can view the virtual content being presented. Furthermore, the system and method are susceptible to be implemented with display units of any dimension and native resolution. In other words, the system and method can be leveraged to generate the virtual content at a high resolution (for example, such as 60 pixels per degree or more) and at a wide field of view, as compared to the prior art.

Moreover, the optical element can be implemented as a passive optical element or an active optical element, as will be elaborated in more detail later. This allows the system and method to be implemented in various different ways, each of which ways have their own advantages. To name a few, the passive optical element would make the system and method simple to implement, yet robust. On the other hand, the active optical element would enable dynamic and precise control, whilst facilitating robust autostereoscopy. Both the implementations support real-time simultaneous presentation of virtual images to eyes of one or more users.

It will be appreciated that the first virtual image and the second virtual image, when presented to the first eye and the second eye of the at least one user, respectively, correspond to a first part and a second part of the synthetic light field. As is well known, presenting slightly different virtual images (namely, slightly offset virtual images) to the eyes of the at least one user enables the at least one user to perceive depth in the virtual content being presented through these virtual images. In some implementations, the synthetic light field can also be presented to a camera. In such a case, a relative location of a camera lens of said camera with respect to the optical element can be determined by utilising the tracking means; a virtual image to be presented to the camera can then be obtained accordingly, and taken into account when generating the at least one image. It will be appreciated that said camera could be a camera of a user device, or could be a camera arranged in a space in which the at least one user is present. The user device could, for example, be a smartphone, a laptop, a tablet, a phablet, or the like.

Throughout the present disclosure, the term "tracking means" refers to a specialised equipment for detecting and/or following a location of at least a first eye and a second eye of a given user. Optionally, the tracking means is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR)) camera, and a monochrome camera. Examples of such a depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera and the at least one depth camera) may be utilised in the tracking means. When different types of images captured by the various different types of tracking cameras are utilised, the location of the user's eyes can be determined highly accurately, as results obtained from one type of image can be used to refine results obtained from another type of image. Herein, these different types of images constitute the tracking data collected by the tracking means, and may be in the form of at least one of: visible-light images, IR images, depth images.

It will be appreciated that the at least one tracking camera is arranged to face the at least one user, to facilitate tracking of the location of the user's eyes. A relative location of the at least one tracking camera with respect to the optical element is fixed, and is pre-known. A location of the first eye and of the second eye with respect to the at least one tracking camera can be accurately determined. Thus, the relative location of the first eye and of the second eye with respect to the optical element can be determined, based on the relative location of the at least one tracking camera with respect to the optical element, and the location of the first eye and of the second eye with respect to the at least one tracking camera. It will be appreciated that the tracking means tracks both eyes of the at least one user with a significantly high accuracy and precision, such that an error in determining the relative location may, for example, be minimised to within a tolerance range of approximately (+/−) 8 millimetres.

It will be appreciated that the tracking means is employed to repeatedly track the location of the eyes of the given user throughout a given session. This allows for repeatedly determining the relative location of the first eye and of the second eye with respect to the optical element in real time or near-real time. It is to be understood that when the synthetic light field is being produced for a plurality of users simultaneously, relative locations of both eyes of each user from amongst the plurality of users are determined in a same manner as discussed hereinabove.

The at least one processor controls an overall operation of the system. The at least one processor is communicably coupled to at least the tracking means and the display unit, and optionally, the optical element (when the optical element is implemented as the active optical element). Optionally, the at least one processor is implemented as a processor of the display unit. Alternatively, optionally, the at least one processor is implemented as a processor of a computing device that is communicably coupled to the display unit. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Moreover, the first virtual image and the second virtual image are obtained based on the relative location of the first eye and of the second eye with respect to the optical element, because the light emanating from the first display region and the second display region is directed towards the first eye and the second eye of the at least one user via the optical element only. In some implementations, when obtaining, the at least one processor is configured to generate the first virtual image and the second virtual image from a perspective of the relative location of the first eye and of the second eye of the at least one user, by employing a three-dimensional (3D) model of at least one virtual object. It will be appreciated that the relative location of the first eye and of the second eye indicate a viewing direction of the first eye and a viewing direction of the second eye, respectively; therefore, the first virtual image and the second virtual image are generated based on these viewing directions. Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to obtain the first virtual image and the second virtual image in a form of two-dimensional (2D) user interface (UI) elements. The 2D UI elements could pertain to, for example, a virtual navigation tool, a virtual gadget, a virtual message, a virtual entity, a virtual entertainment media, a virtual information, or similar.

For purposes of the present disclosure, it will be appreciated that the first display region and the second display region (of the display unit) can be implemented on a same display or separate displays. In other words, the display unit may either comprise a single display that comprises both the first display region and the second display region, or comprise a first display and at least one second display, the first display comprising the first display region, the at least one second display comprising the second display region. Examples of such displays include, but are not limited to, Liquid Crystal Displays (LCD), Light-Emitting Diode (LED) displays, Organic LED (OLED) displays, micro LED displays, Active Matrix OLED (AMOLED) displays, and Liquid Crystal on Silicon (LCoS)-based displays.

Optionally, the first display region and the second display region are arranged at different optical depths with respect to the eyes of the at least one user. Herein, an optical depth of a given display region (namely, the first display region or the second display region) can be determined as a sum of a distance between the given display region and the optical element and a distance between the optical element and the eyes of the at least one user, such distances being measured along the optical path. It will be appreciated here that a difference between the different optical depths (of the first display region and the second display region with respect to the eyes of the at least one user) is negligible as compared to the distance between the optical element and the eyes. A technical benefit of arranging the first display region and the second display region at the different optical depths is that it enables to achieve even more robust stereoscopy. As mentioned earlier, autostereoscopy is achieved by presenting the first virtual image and the second virtual image to the at least one user. Said different optical depths further improve the robustness and the quality of the autostereoscopy. This is because due to the different optical depths, the eyes would see an image formed by the light emanating from the first display region at a different location than an image formed by the light emanating from the second display region.

In some implementations, the first display region and the second display region may be arranged side-by-side. In other implementations, the second display region may surround the first display region. Some examples of such an implementation have been provided in conjunction with FIGS. 3A and 3B. It will be appreciated that the second display region could be implemented as a region of the display unit that is not visible to the at least one user directly. Moreover, in yet other implementations, the first display region and the second display region could be intermixed. In such a case, there is no physical demarcation between the first display region and the second display region.

Most importantly, it should be noted that irrespective of an implementation of the display unit, the at least one image (that is displayed at the display unit) is not similar to a conventional light field image (namely, a conventional radiance image). Notably, the at least one image is different from any kind of light field image known in the prior art. In implementations where the first display region and the second display region are on a same display, the at least one image comprises a single image, wherein a first part of this single image is displayed at the first display region, while a second part of this single image is displayed at the second display region. In other implementations where the first display region and the second display region are on separate displays, the at least one image comprises a first image and at least one second image, wherein the first image is displayed at the first display (comprising the first display region), while the at least one second image is displayed at the at least one second display (comprising the second display region).

The optical element is employed to re-direct the light emanating from the photo-emitting cells on the second display region to bend towards the first eye and the second eye of the at least one user, whilst allowing the light emanating from the photo-emitting cells on the first display region to be incident upon the first eye and the second eye of the at least one user without bending. How this produces an autostereoscopic view for the at least one user will be elaborated later in more detail.

Optionally, when the optical element is made of the birefringent material, the at least one processor is configured to control a polarization orientation of light emanating from a given group of photo-sensitive cells of the second display region, based on a birefringence of the birefringent material, an incidence angle of said light being incident upon a given part of the optical element, and the refraction angle of the light after being re-directed by the given part of the optical element towards a given eye of the at least one user. The given group comprises neighbouring photo-sensitive cells. It will be appreciated that a polarization orientation of light emanating from the second display region needs to be different from a polarization orientation of light emanating from the first display region. This is based on a fact that a birefringent material exhibits different refractive indices for light polarized in different polarization orientations. Accordingly, a technical benefit of controlling the polarization orientation of the light based on the aforesaid factors is that the light emanating from the given group of photo-sensitive cells of the second display region can be re-directed towards to the given eye of the at least one user accurately by utilising the birefringence of the birefringent material. In order to understand this better, an example implementation has been illustrated in conjunction with FIG. 2A. It should be noted here that this is applicable for both the passive optical element as well as the active control element. Irrespective of whether the optical element is passive or active, the optical element acts as a birefringent combiner that combines the light emanating from the photo-sensitive cells of the first display region (that passes through the optical element without bending) with the light emanating from the photo-sensitive cells of the second display region (that bends while passing through the optical element towards the given eye).

In implementations where the first display region and the second display region are on the separate displays, or in implementations where the first display region and the second display region are on the same display, but can be configured differently, the first display region can be configured to emit horizontally polarized light, while the second display region can be configured to emit vertically polarized light. In other implementations, both the first display region and the second display region can be configured to emit unpolarized light (namely, light having all polarization orientations), while the optical element can be configured to utilise a horizontally-polarized component of the unpolarized light emanating from the first display region, whilst utilising a vertically-polarized component of the unpolarized light emanating from the second display region, or vice versa.

According to an embodiment, the optical element is actively controllable. Optionally, when the optical element is made of the birefringent material, the birefringent material comprises a liquid crystal material or an electro-optic quartz, and the at least one processor is configured to control the optical element by controlling a refractive index of the liquid crystal material or the electro-optic quartz in a given part of the optical element, based on an incidence angle of light emanating from a given group of photo-sensitive cells of the second display region being incident upon the given part of the optical element and a refraction angle of the light after being re-directed by the given part of the optical element towards the given eye of the at least one user. The refractive index can be controlled using a drive circuit of the optical element. Driving circuits are well known in the art. A technical benefit of controlling the optical element in such a case is that selection (interchangeably referred to as "generation", throughout the present disclosure) of intensity values for pixels of the at least one image can be made easily, as compared to a case of the passive optical element. How intensity values can be selected will be described later in more detail.

Alternatively, optionally, when the optical element is made of the metamaterial, the optical element is semi-transparent and comprises micromirrors, and the at least one processor is configured to control the optical element by controlling an orientation of a given micromirror, based on an incidence angle of light emanating from a given group of photo-sensitive cells of the second display region being incident upon the optical element and a refraction angle of the light after being re-directed by the given mirror towards the given eye of the at least one user. Herein, the angle of incidence is with respect to a plane of the optical element, and not with respect to the given micromirror. The orientation of the given micromirror can be controlled by applying an electric field. In such a case, the micromirrors can be coated with electrostatically responsive materials; changes in the electric field cause the micromirrors to rotate or tilt. The technical benefit of controlling the optical element in such a case is that the selection of the intensity values for the pixels of the at least one image can be made easily, as compared to the case of the passive optical element. It will be appreciated that in case of the passive optical element, the orientation of the micromirrors is fixed, and the intensity values for the pixels of the at least one image are selected accordingly. In such a case, the orientation of all the micromirrors could be in a same direction. How these intensity values can be selected will be described later in more detail.

There will now be described how the optical element is controlled at a level of photo-emitting cells, and how an autostereoscopic view is presented to the at least one user in the case of the active optical element. Optionally, the at least one processor is configured to control the optical element by:

- controlling a first part of the optical element upon which first light emanating from a first photo-emitting cell of the second display region is incident, to re-direct the first light towards the first eye of the at least one user, based on the relative location of the first eye with respect to the optical element;
- controlling a second part of the optical element upon which second light emanating from a second photo-emitting cell of the second display region is incident, to re-direct the second light towards the second eye of the at least one user, based on the relative location of the second eye with respect to the optical element; and
- controlling the first part and the second part of the optical element to allow third light emanating from a third photo-emitting cell of the first display region to be directed towards the first eye and the second eye, respectively, without bending.

As a result, the first eye sees a combination of the first light and the third light, while the second eye sees a combination of the second light and the third light. This allows for presenting different intensities to different eyes of the at least one user, thereby presenting the autostereoscopic view.

There will now be described how an autostereoscopic view is presented to the at least one user in the case of the passive optical element. Optionally, a first part of the optical element is employed to re-direct first light emanating from a first photo-emitting cell of the second display region towards the first eye of the at least one user, and a second part of the optical element is employed to re-direct second light emanating from a second photo-emitting cell of the second display region towards the second eye of the at least one user, wherein the first part and the second part of the optical element are employed to allow third light emanating from a third photo-emitting cell of the first display region to be directed towards the first eye and the second eye, respectively, without bending. As a result, the first eye sees the combination of the first light and the third light, while the second eye sees the combination of the second light and the third light. This allows for presenting different intensities to the different eyes of the at least one user, thereby presenting the autostereoscopic view.

Irrespective of whether the optical element is active or passive, respective intensities of the first light, the second light and the third light correspond to respective intensity values of pixels of the at least one image. Optionally, in this regard, a first pixel, a second pixel and a third pixel of the at least one image correspond to the first photo-emitting cell, the second photo-emitting cell, and the third photo-emitting cell, wherein when generating the at least one image, the at least one processor is configured to generate a first intensity value, a second intensity value and a third intensity value for the first pixel, the second pixel and the third pixel of the at least one image, respectively, based on a first output intensity value and a second output intensity value of a given 3D point in the first virtual image and the second virtual image, respectively. The first output intensity value and the second output intensity value of the given 3D point are determined from the first virtual image and the second virtual image, based on a viewing direction of the given 3D point from the first eye and the second eye. It will be appreciated that irrespective of whether the optical element is passive or active, such generation of the first intensity value, the second intensity value and the third intensity value for the first pixel, the second pixel and the third pixel of the at least one image can be performed by solving linear equations. Additionally or alternatively, the aforesaid intensity values can also be generated by employing a gradient descent process.

In some cases, the first output intensity value and the second output intensity value can be adjusted to achieve a better overall image quality, for example, by sacrificing contrast to some extent. As an example, if the first output intensity value and the second output intensity value of the given 3D point correspond to white (255, 255, 255) for the first eye and full black (0, 0, 0) for the second eye, there is no combination of the first intensity value, the second intensity value and the third intensity value for the first pixel, the second pixel and the third pixel of the at least one image that would result in 100 percent accurate results when combined. In such a case, the first output intensity value and the second output intensity value can be compressed, for example from a range of 0-255 to another range of 64-192. Accordingly, the first intensity value, the second intensity value and the third intensity value (for the first pixel, the second pixel and the third pixel of the at least one image) can be set as (0, 0, 0), (255, 255, 255) and (128, 128, 128), respectively.

It will also be appreciated that not only there will be linear equations corresponding to each 3D point in the first virtual image and the second virtual image, but also there will be interdependencies in these linear equations. This is primarily due to a fact that a particular photo-sensitive cell in the first display region is utilised to generate two different pixels in the first virtual image and two different pixels in the second virtual image; similarly, a particular photo-sensitive cell in the second display region is utilised to generate two different pixels in the first virtual image and two different pixels in the second virtual image. So, there are two one-to-many mappings between these photo-sensitive cells and the pixels they present.

In this regard, there will now be described how the autostereoscopic view is presented to the at least one user in the case of the active optical element. Optionally, the at least one processor is configured to control the optical element by:

- controlling another first part of the optical element upon which the first light emanating from the first photo-emitting cell of the second display region is incident, to re-direct the first light towards the second eye of the at least one user, based on the relative location of the second eye with respect to the optical element;
- controlling another second part of the optical element upon which the second light emanating from the second photo-emitting cell of the second display region is incident, to re-direct the second light towards the first eye of the at least one user, based on the relative location of the first eye with respect to the optical element; and
- controlling the another first part and the another second part of the optical element to allow fourth light emanating from a fourth photo-emitting cell of the first display region to be directed towards the first eye and the second eye, respectively, without bending.

Thus, the first eye sees a combination of the second light and the fourth light, while the second eye sees a combination of the first light and the fourth light.

Similarly, there will now be described how the autostereoscopic view is presented to the at least one user in the case of the passive optical element. Optionally, another first part of the optical element is employed to re-direct the first light emanating from the first photo-emitting cell of the second display region towards the second eye of the at least one user, and another second part of the optical element is employed to re-direct the second light emanating from the second photo-emitting cell of the second display region towards the first eye of the at least one user, wherein the another first part and the another second part of the optical element are employed to allow fourth light emanating from a fourth photo-emitting cell of the first display region to be directed towards the first eye and the second eye, respectively, without bending.

Irrespective of whether the optical element is active or passive, respective intensities of the first light, the second light, the third light and the fourth light correspond to respective intensity values of pixels of the at least one image. Optionally, in this regard, a first pixel, a second pixel, a third pixel and a fourth pixel of the at least one image correspond to the first photo-emitting cell, the second photo-emitting cell, the third photo-emitting cell and the fourth photo-emitting cell, wherein when generating the at least one image, the at least one processor is configured to generate a first intensity value, a second intensity value, a third intensity value and a fourth intensity value for the first pixel, the second pixel, the third pixel and the fourth pixel of the at least one image, respectively, based on a first output intensity value and a second output intensity value of a given 3D point in the first virtual image and the second virtual image, respectively, and a first output intensity value and a second output intensity value of another given 3D point in the first virtual image and the second virtual image, respectively, wherein the given 3D point corresponds to the first part and the second part of the optical element, while the another given 3D point corresponds to the another first part and the another second part of the optical element. As mentioned earlier, such generation of the intensity values can be performed by solving linear equations.

Moreover, optionally, the system further comprising gaze-tracking means, wherein the at least one processor is configured to:

- utilise the gaze-tracking means to determine gaze directions of the eyes of the at least one user;
- detect when the first part and the second part of the optical element correspond to the gaze directions of the eyes of the at least one user, but the another first part and the another second part of the optical element do not correspond to the gaze directions of the eyes of the at least one user; and
- when it is detected that the first part and the second part of the optical element correspond to the gaze directions, but the another first part and the another second part of the optical element do not correspond to the gaze directions, prioritise minimising a visual error in output intensity values produced for the given 3D point over output intensity values produced for the another given 3D point.

Optionally, the tracking means is implemented as the gaze-tracking means. In such a case, the at least one processor is configured to utilise the tracking data collected by the tracking means, for determining the gaze directions of the eyes of the at least one user. This allows for detecting when the first part and the second part of the optical element correspond to the gaze directions of the eyes of the at least one user, but the another first part and the another second part of the optical element do not correspond to the gaze directions of the eyes of the at least one user. Optionally, in this regard, when the tracking data comprises a plurality of images of a given eye of a given user from amongst the plurality of users, the at least one processor is configured to: extract a plurality of features of the given eye from a given image; identify at least one of: a pupil of the given eye, a position of the pupil with respect to corners of the given eye, a curvature of an eyelid of the given eye, a position of an eyelash of the given eye, a shape of the given eye, a size of the given eye, based on the plurality of features, to determine the gaze directions and optionally, to detect when the given eye of the given user is closed. Gaze tracking is well-known in the art.

When it is detected that the first part and the second part of the optical element correspond to the gaze directions of the eyes of the at least one user, but the another first part and the another second part of the optical element do not correspond to the gaze directions of the eyes of the at least one user, it means that a part of the virtual content presented by the first part and the second part of the optical element corresponds to a region of interest within a field of view of the at least one user, while another part of the virtual content presented by the another first part and the another second part of the optical element is not a part of the region of interest of the at least one user. Therefore, minimising the visual error in the output intensity values produced for the given 3D point are prioritised over the output intensity values produced for the another given 3D point. A technical benefit of such prioritising is that the linear equations can be simplified, thereby making the processing easier. In other words, processing resources and processing time of the at least one processor would not be wasted in solving complex interdependent linear equations, when they are not even required (namely, when the another part of the virtual content presented by the another first part and the another second part of the optical element is not a part of the region of interest of the at least one user). This is based on a fact that humans perceive colours more accurately in the region of interest (namely, a region where they are looking), as compared to a remaining region of their field of view.

Furthermore, in some implementations, the system further comprises an optical combiner arranged on the optical path of the display unit and on an optical path of a real-world light field of a real-world environment. In such implementations, the optical element is arranged between the display unit and the optical combiner on the optical path. The optical combiner is employed to reflect the light received from the optical element towards the first eye and the second eye of the at least one user, whilst optically combining said light with the real-world light field. In such a case, the relative location of the eyes of the at least one user can be first determined with respect to the optical combiner. The relative location of the eyes with respect to the optical element can then be determined based on the relative location of the eyes with respect to the optical combiner, and the relative location of the optical combiner with respect to the optical element. Optionally, the optical combiner is implemented as at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to an image plane of the display unit lies in a range of 30 degrees and 60 degrees.

Optionally, in such implementations, the at least one processor is configured to:

- determine an intensity of a part of the real-world light field passing through a part of the optical combiner from which the first light emanating from the first photo-emitting cell and the third light emanating from the third photo-emitting cell reflect towards the first eye;

detect when the intensity of the part of the real-world light field passing through the part of the optical combiner is lower than the first output intensity value of the given 3D point; and when it is detected that the intensity of said part of the real-world light field is lower than the first output intensity value of the given 3D point, adjust the first intensity value of the first pixel and the third intensity value of the third pixel, based on a difference between the first output intensity value of the given 3D point and the intensity of said part of the real-world light field.

When the intensity of the part of the real-world light field (passing through the part of the optical combiner) is lower than the first output intensity value of the given 3D point, the intensity of the part of the real-world light field can be leveraged to produce at least a part of an overall intensity corresponding to the first output intensity value. Therefore, the first intensity value of the first pixel and the third intensity value of the third pixel can be adjusted to only produce the difference between the overall intensity and the intensity of said part of the real-world light field. Advantageously, this facilitates in reducing power consumption of the display unit. This technical advantage is applicable, irrespective of whether the optical element is passive or active. Herein, the term "overall intensity" refers to an intensity of the synthetic light field that was originally intended to be presented to the at least one user. The overall intensity depends on the first output intensity value of the given 3D point.

The intensity of the part of the real-world light field (passing through the part of the optical combiner) can be determined by:

utilising at least one real-world-facing camera of the system to capture at least one 2D real-world image of the real-world environment, reprojecting the at least one 2D real-world image from a perspective of the at least one real-world-facing camera to a perspective of the viewpoint of the given eye (for example, using depth data from a separate depth camera, or from a stereo disparity analysis of a pair of visible-light images of the real-world environment captured by a pair of visible-light cameras implemented as the at least one real-world-facing camera, or similar), and mapping a viewing direction of the part of the optical combiner from the given eye with viewing directions of pixels in a reprojected version of the at least one 2D real-world image from the given eye.

Similarly, optionally, the at least one processor is configured to:

determine an intensity of a part of the real-world light field passing through a part of the optical combiner from which the second light emanating from the second photo-emitting cell and the third light emanating from the third photo-emitting cell pass towards the first eye;

detect when the intensity of the part of the real-world light field passing through the part of the optical combiner is lower than the second output intensity value of the given 3D point; and when it is detected that the intensity of said part of the real-world light field is lower than the second output intensity value of the given 3D point, adjust the second intensity value of the second pixel and the third intensity value of the third pixel, based on a difference between the second output intensity value of the given 3D point and the intensity of said part of the real-world light field.

It will be appreciated that such adjusting of the first intensity value of the first pixel, the second intensity value of the second pixel and the third intensity value of the third pixel can be performed by adjusting the aforementioned linear equations.

Moreover, optionally, the at least one processor is configured to:

determine intensities of different parts of the real-world light field passing through the optical combiner towards a given eye;

detect when an intensity of a given part of the real-world light field passing through a given part of the optical combiner towards the given eye is greater than a predefined threshold intensity; and when it is detected the intensity of the given part of the real-world light field passing through the given part of the optical combiner towards the given eye is greater than the predefined threshold intensity, dim pixels of the first display region and the second display region on whose optical path the given part of the optical combiner lies.

The aforementioned steps can be performed for each eye of the at least one user. In this regard, the intensities of the different parts of the real-world light field passing through the optical combiner towards the given eye can be determined as described earlier. As an example, said intensities can be determined in lux values. The predefined threshold intensity may, for example, lie in a range of 10000 lux to 25000 lux.

A technical benefit of dimming the pixels in such a case is that ghosting artefacts can be hidden in those part(s) of the optical combiner where the real-world light field has a relatively bright intensity (such that the virtual content would not be visible anyway). This also reduces the power consumption of the display unit.

The present disclosure also relates to the method as described above. Various embodiments and variants disclosed above, with respect to the aforementioned first aspect, apply mutatis mutandis to the method.

Optionally, when the optical element is made of the birefringent material, the method further comprises controlling a polarization orientation of light emanating from a given group of photo-sensitive cells of the second display region, based on a birefringence of the birefringent material, an incidence angle of said light being incident upon a given part of the optical element and a refraction angle of the light after being re-directed by the given part of the optical element towards a given eye of the at least one user.

Optionally, when the optical element is made of the birefringent material, the birefringent material comprises a liquid crystal material, wherein the method further comprises controlling the optical element by controlling a refractive index of the liquid crystal material in a given part of the optical element, based on an incidence angle of light emanating from a given group of photo-sensitive cells of the second display region being incident upon the given part of the optical element and a refraction angle of the light after being re-directed by the given part of the optical element towards a given eye of the at least one user.

Alternatively, optionally, when the optical element is made of the metamaterial, the optical element is semi-transparent and comprises micromirrors, wherein the method further comprises controlling the optical element by controlling an orientation of a given micromirror, based on an incidence angle of light emanating from a given group of photo-sensitive cells of the second display region being incident upon the optical element and a refraction angle of the light after being re-directed by the given mirror towards a given eye of the at least one user.

Optionally, the method further comprises controlling the optical element by:

- controlling a first part of the optical element upon which first light emanating from a first photo-emitting cell of the second display region is incident, to re-direct the first light towards the first eye of the at least one user, based on the relative location of the first eye with respect to the optical element;
- controlling a second part of the optical element upon which second light emanating from a second photo-emitting cell of the second display region is incident, to re-direct the second light towards the second eye of the at least one user, based on the relative location of the second eye with respect to the optical element; and
- controlling the first part and the second part of the optical element to allow third light emanating from a third photo-emitting cell of the first display region to be directed towards the first eye and the second eye, respectively, without bending.

Optionally, in this regard, a first pixel, a second pixel and a third pixel of the at least one image correspond to the first photo-emitting cell, the second photo-emitting cell, and the third photo-emitting cell, wherein the step of generating the at least one image comprises generating a first intensity value, a second intensity value and a third intensity value for the first pixel, the second pixel and the third pixel of the at least one image, respectively, based on a first output intensity value and a second output intensity value of a given 3D point in the first virtual image and the second virtual image, respectively.

Moreover, optionally, the method further comprises:

- controlling another first part of the optical element upon which the first light emanating from the first photo-emitting cell of the second display region is incident, to re-direct the first light towards the second eye of the at least one user, based on the relative location of the second eye with respect to the optical element;
- controlling another second part of the optical element upon which the second light emanating from the second photo-emitting cell of the second display region is incident, to re-direct the second light towards the first eye of the at least one user, based on the relative location of the first eye with respect to the optical element; and
- controlling the another first part and the another second part of the optical element to allow fourth light emanating from a fourth photo-emitting emitting cell of the first display region to be directed towards the first eye and the second eye, respectively, without bending.

Optionally, in this regard, a first pixel, a second pixel, a third pixel and a fourth pixel of the at least one image correspond to the first photo-emitting cell, the second photo-emitting cell, the third photo-emitting cell and the fourth photo-emitting cell, wherein the step of generating the at least one image comprises generating a first intensity value, a second intensity value, a third intensity value and a fourth intensity value for the first pixel, the second pixel, the third pixel and the fourth pixel of the at least one image, respectively, based on a first output intensity value and a second output intensity value of a given 3D point in the first virtual image and the second virtual image, respectively, and a first output intensity value and a second output intensity value of another given 3D point in the first virtual image and the second virtual image, respectively, wherein the given 3D point corresponds to the first part and the second part of the optical element, while the another given 3D point corresponds to the another first part and the another second part of the optical element.

Optionally, the method further comprises:

- utilising gaze-tracking means to determine gaze directions of the eyes of the at least one user;
- detecting when the first part and the second part of the optical element correspond to the gaze directions of the eyes of the at least one user, but the another first part and the another second part of the optical element do not correspond to the gaze directions of the eyes of the at least one user; and
- when it is detected that the first part and the second part of the optical element correspond to the gaze directions, but the another first part and the another second part of the optical element do not correspond to the gaze directions, prioritising minimising a visual error in output intensity values produced for the given 3D point over output intensity values produced for the another given 3D point.

Furthermore, in some implementations, an optical combiner is arranged on the optical path of the display unit and on an optical path of a real-world light field of a real-world environment, wherein the optical combiner is employed to reflect the light received from the optical element towards the first eye and the second eye of the at least one user, whilst optically combining said light with the real-world light field. Optionally, in such implementations, the method further comprises:

- determining an intensity of a part of the real-world light field passing through a part of the optical combiner from which the first light emanating from the first photo-emitting cell and the third light emanating from the third photo-emitting cell pass towards the first eye;
- detecting when the intensity of the part of the real-world light field passing through the part of the optical combiner is lower than the first output intensity value of the given 3D point; and
- when it is detected that the intensity of said part of the real-world light field is lower than the first output intensity value of the given 3D point, adjusting the first intensity value of the first pixel and the third intensity value of the third pixel, based on a difference between the first output intensity value of the given 3D point and the intensity of said part of the real-world light field.

Moreover, optionally, the method further comprises:

- determining intensities of different parts of the real-world light field passing through the optical combiner towards a given eye;
- detecting when an intensity of a given part of the real-world light field passing through a given part of the optical combiner towards the given eye is greater than a predefined threshold intensity; and
- when it is detected the intensity of the given part of the real-world light field passing through the given part of the optical combiner towards the given eye is greater than the predefined threshold intensity, dimming pixels of the first display region and the second display region on whose optical path the given part of the optical combiner lies.

DETAILED DESCRIPTION OF THE DRAWINGS

Referring to FIG. 1, illustrated is an example implementation of a system 100 incorporating light field display using a birefringent material or a metamaterial, in accordance with an embodiment of the present disclosure. The system 100 comprises tracking means 102, a display unit 104 comprising a first display region 106 and a second display region 108, an optical element 110 arranged on an optical path of the display unit 104, and at least one processor (depicted as a processor 112). The optical element 110 can be made of any one of: (i) a birefringent material, (ii) a metamaterial. The processor 112 is configured to:

utilise the tracking means 102 to determine a relative location of a first eye 114*a* and of a second eye 114*b* of at least one user with respect to the optical element 110;

obtain a first virtual image and a second virtual image to be presented to the first eye 114*a* and the second eye 114*b* of the at least one user, respectively, based on the relative location of the first eye 114*a* and of the second eye 114*b* of the at least one user with respect to the optical element 110;

generate at least one image to be employed at the display unit 104, based on the first virtual image, the second virtual image, the relative location of the first eye 114*a* and of the second eye 114*b* of the at least one user with respect to the optical element 110, and a relative location of the optical element 110 with respect to the first display region 106 and the second display region 108; and display the at least one image via the display unit 104.

The optical element 110 is employed to re-direct light 116 emanating from photo-emitting cells on the second display region 108 to bend towards the first eye 114*a* and the second eye 114*b* of the at least one user, whilst allowing light 118 emanating from photo-emitting cells on the first display region 106 to be incident upon the first eye 114*a* and the second eye 114*b* of the at least one user without bending.

It may be understood by a person skilled in the art that FIG. 1 includes a simplified example implementation of the system 100, for sake of clarity, which should not unduly limit the scope of the claims herein. It is to be understood that the specific implementation of the system 100 is not to be construed as limiting it to specific numbers or types of tracking means, display units, second regions, optical elements, and processors. The person skilled in the art will recognize many variations, alternatives, and modifications of embodiments of the present disclosure.

Figure 2A:
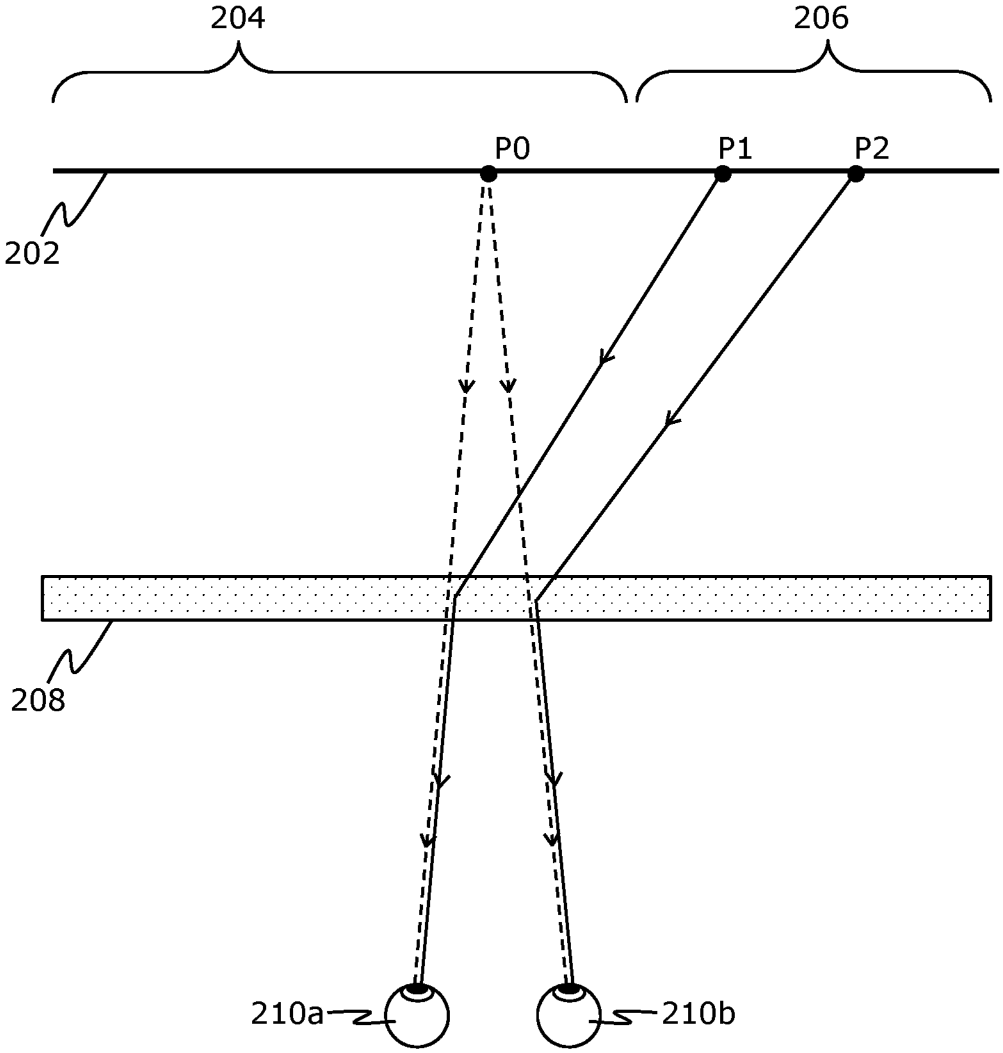
FIGS. 2A and 2B illustrate how autostereoscopic view is achieved, pursuant to embodiments of the present disclosure.
Figure 2B:
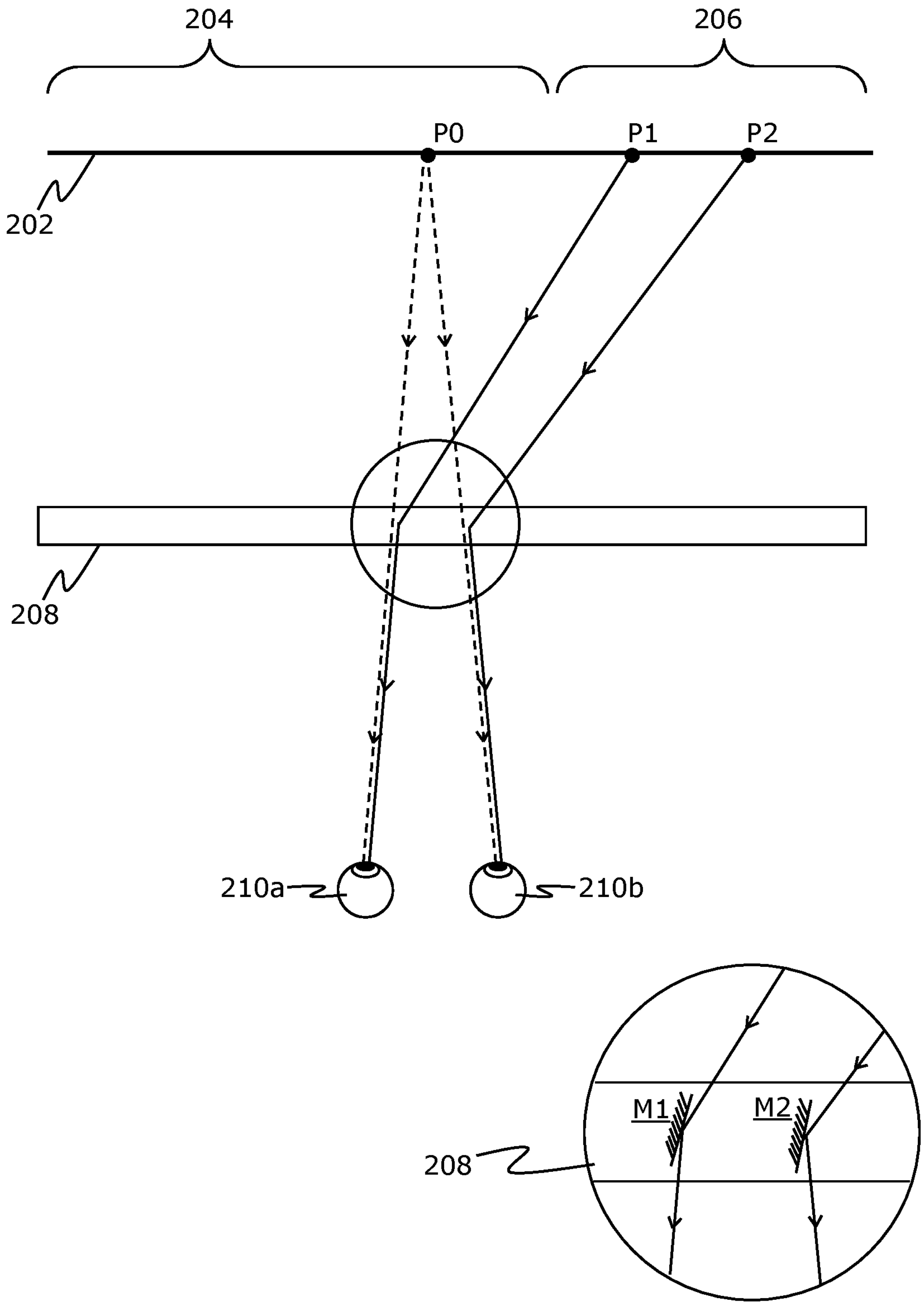

Referring to FIGS. 2A and 2B, there is illustrated how autostereoscopic view is achieved, pursuant to embodiments of the present disclosure. There is shown a display unit 202 comprising a first display region 204 and a second display region 206, and an optical element 208. There are also shown a photo-emitting cell P0 (from amongst a plurality of photo-emitting cells) of the first display region 204, and two photo-emitting cells P1 and P2 (from amongst a plurality of photo-emitting cells) of the second display region 206. The optical element 208 is employed to re-direct light emanating from the photo-emitting cells P1 and P2 on the second display region 206 to bend towards the first eye 210*a* and the second eye 210*b* of a given user, respectively, whilst allowing light emanating from the photo-emitting cell P0 on the first display region 204 to be incident upon the first eye 210*a* and the second eye 210*b* of the given user without bending. Irrespective of whether the optical element 208 is passive or active, the optical element 208 acts as a birefringent combiner that combines the light emanating from the photo-sensitive cell P0 of the first display region 204 with the light emanating from the photo-sensitive cells P1 and P2 of the second display region 206, and passes said combinations towards the first eye 210*a* and the second eye 210*b*, respectively.

With reference to FIG. 2A, the optical element 208 is made of a birefringent material. With reference to FIG. 2B, the optical element 208 is made of a metamaterial; in such a case, the optical element 208 is semi-transparent and comprises micromirrors (not shown for the sake of simplicity). In FIG. 2B, there is also depicted an optical interaction of the light emanating from the photo-sensitive cells P1 and P2 with a portion of the optical element 208; micromirrors M1 and M2 have been shown as a part of said portion of the optical element 208.

Figure 3A:
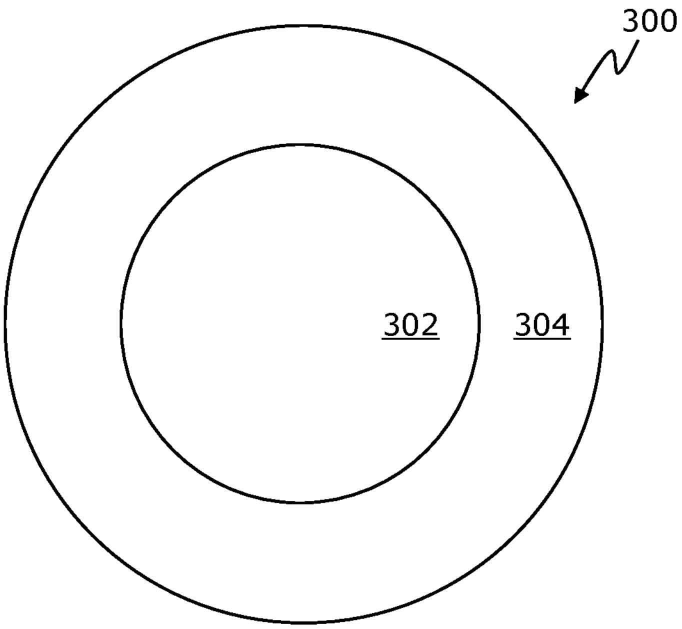
FIGS. 3A and 3B depict different implementations of a display unit, in accordance with an embodiment of the present disclosure.
Figure 3B:
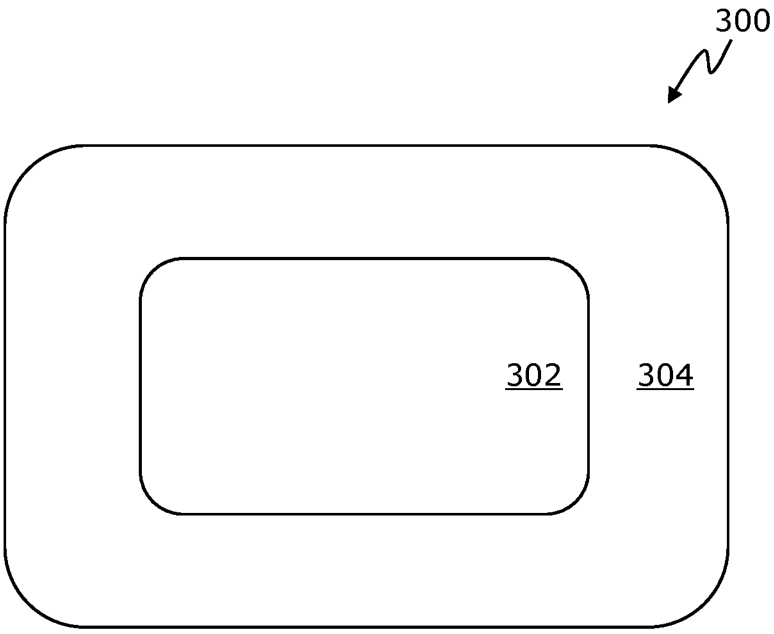

FIGS. 3A and 3B depict different implementations of a display unit 300, in accordance with an embodiment of the present disclosure. The display unit 300 comprises a first display region 302 and a second display region 304. As shown, the second display region 304 surrounds the first display region 302. The second display region 304 can be in a form of a single continuous display region, or could be in a form of separate display regions that are arranged to surround the first display region 302.

Figure 4:
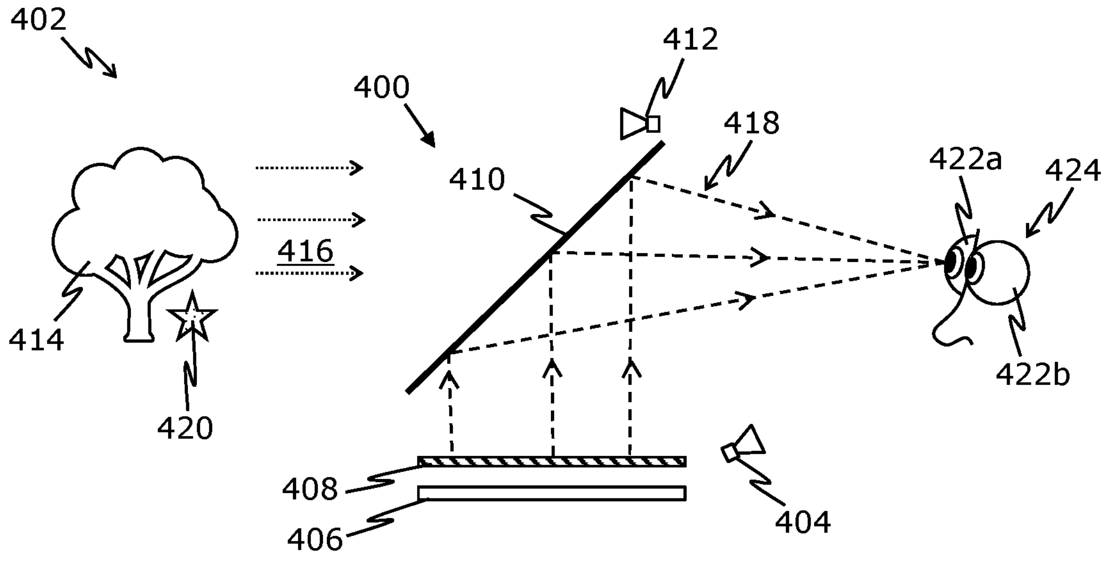
FIG. 4 depicts an implementation of a system incorporating light field display using a birefringent material or a metamaterial within a real-world environment, in accordance with an embodiment of the present disclosure.

FIG. 4 depicts an implementation of a system 400 incorporating light field display using a birefringent material or a metamaterial within a real-world environment 402, in accordance with an embodiment of the present disclosure. The system 400 comprises tracking means 404, a display unit 406 comprising a first display region and a second display region (not shown for the sake of simplicity), an optical element 408 arranged on an optical path of the display unit 406, and at least one processor (not shown). The at least one processor is configured to perform various operations as described earlier. Optionally, in this implementation, the system 400 further comprises an optical combiner 410 and a real-world-facing camera 412. In the real-world environment 402, there is at least one real-world object, depicted as a real-world object 414 (shown as a tree, for illustration purposes only). The optical combiner 410 is arranged on the optical path of the display unit 406 and on an optical path of a real-world light field 416 of the real-world environment 402. The optical combiner 410 is employed to reflect a synthetic light field 418 presenting virtual content 420 (shown as a star, for illustration purposes only) produced by the display unit 406 and the optical element 408 towards a first eye 422*a* and a second eye 422*b* of at least one user (depicted as a user 424), whilst optically combining the synthetic light field 418 with the real-world light field 416.

FIGS. 2A-2B, 3A-3B and 4 are merely examples, which should not unduly limit the scope of the claims herein. A person skilled in the art will recognize many variations, alternatives, and modifications of embodiments of the present disclosure.

Figure 5:
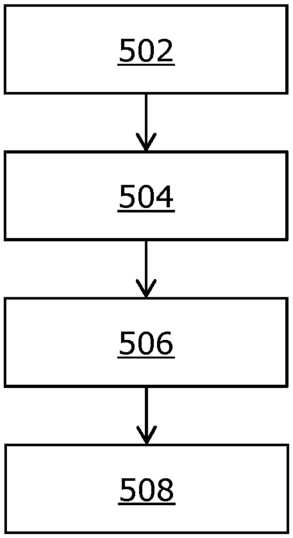
FIG. 5 depicts steps of a method incorporating light field display using a birefringent material or a metamaterial, in accordance with an embodiment of the present disclosure.

Referring to FIG. 5, illustrated are steps of a method incorporating light field display using a birefringent material or a metamaterial, in accordance with an embodiment of the present disclosure. At step 502, tracking means is utilised to determine a relative location of a first eye and of a second eye of at least one user with respect to an optical element, the optical element being arranged on an optical path of a display unit comprising a first display region and a second display region, the optical element being made of any one of: (i) a birefringent material, (ii) a metamaterial. At step 504, a first virtual image and a second virtual image to be presented to the first eye and the second eye of the at least one user are obtained, based on the relative location of the first eye and of the second eye of the at least one user with respect to the optical element, respectively. At step 506, at least one image to be employed at the display unit is generated, based on the first virtual image, the second virtual image, the relative location of the first eye and of the second eye of the at least one user with respect to the optical element, and a relative location of the optical element with respect to the first display region and the second display region. At step 508, the at least one image is displayed via the display unit. The optical element is employed to re-direct light emanating from photo-emitting cells on the second display region to bend towards the first eye and the second eye of the at least one user, whilst allowing light emanating from photo-emitting cells on the first display region to be incident upon the first eye and the second eye of the at least one user without bending.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:

tracking means;

a display unit comprising a first display region and a second display region;

an optical element arranged on an optical path of the display unit, the optical element being made of any one of: (i) a birefringent material, (ii) a metamaterial; and at least one processor configured to:

utilise the tracking means to determine a relative location of a first eye and of a second eye of at least one user with respect to the optical element;

obtain a first virtual image and a second virtual image to be presented to the first eye and the second eye of the at least one user, respectively, based on the relative location of the first eye and of the second eye of the at least one user with respect to the optical element;

generate at least one image to be employed at the display unit, based on the first virtual image, the second virtual image, the relative location of the first eye and of the second eye of the at least one user with respect to the optical element, and a relative location of the optical element with respect to the first display region and the second display region; and display the at least one image via the display unit, wherein the optical element is employed to re-direct light emanating from photo-emitting cells on the second display region to bend towards the first eye and the second eye of the at least one user, while allowing light emanating from photo-emitting cells on the first display region to be incident upon the first eye and the second eye of the at least one user without bending.

2. The system of claim 1, wherein the optical element is made of the birefringent material, wherein the at least one processor is configured to control a polarization orientation of light emanating from a given group of photo-sensitive cells of the second display region, based on a birefringence of the birefringent material, an incidence angle of said light being incident upon a given part of the optical element and a refraction angle of the light after being re-directed by the given part of the optical element towards a given eye of the at least one user.

3. The system of claim 1, wherein the optical element is actively controllable.

4. The system of claim 3, wherein when the optical element is made of the birefringent material, the birefringent material comprises a liquid crystal material, wherein the at least one processor is configured to control the optical element by controlling a refractive index of the liquid crystal material in a given part of the optical element, based on an incidence angle of light emanating from a given group of photo-sensitive cells of the second display region being incident upon the given part of the optical element and a refraction angle of the light after being re-directed by the given part of the optical element towards a given eye of the at least one user.

5. The system of claim 3, wherein when the optical element is made of the metamaterial, the optical element is semi-transparent and comprises micromirrors, wherein the at least one processor is configured to control the optical element by controlling an orientation of a given micromirror, based on an incidence angle of light emanating from a given group of photo-sensitive cells of the second display region being incident upon the optical element and a refraction angle of the light after being re-directed by the given mirror towards a given eye of the at least one user.

6. The system of claim 3, wherein the at least one processor is configured to control the optical element by:

controlling a first part of the optical element upon which first light emanating from a first photo-emitting cell of the second display region is incident, to re-direct the first light towards the first eye of the at least one user, based on the relative location of the first eye with respect to the optical element;

controlling a second part of the optical element upon which second light emanating from a second photo-emitting cell of the second display region is incident, to re-direct the second light towards the second eye of the at least one user, based on the relative location of the second eye with respect to the optical element; and controlling the first part and the second part of the optical element to allow third light emanating from a third photo-emitting cell of the first display region to be directed towards the first eye and the second eye, respectively, without bending.

7. The system of claim 1, wherein a first part of the optical element is employed to re-direct first light emanating from a first photo-emitting cell of the second display region towards the first eye of the at least one user, and a second part of the optical element is employed to re-direct second light emanating from a second photo-emitting cell of the second display region towards the second eye of the at least one user, wherein the first part and the second part of the optical element are employed to allow third light emanating from a third photo-emitting cell of the first display region to be directed towards the first eye and the second eye, respectively, without bending.

8. The system of claim 6, wherein a first pixel, a second pixel and a third pixel of the at least one image correspond to the first photo-emitting cell, the second photo-emitting cell, and the third photo-emitting cell, wherein when generating the at least one image, the at least one processor is configured to generate a first intensity value, a second intensity value and a third intensity value for the first pixel, the second pixel and the third pixel of the at least one image, respectively, based on a first output intensity value and a second output intensity value of a given 3D point in the first virtual image and the second virtual image, respectively.

9. The system of claim 8, further comprising an optical combiner arranged on the optical path of the display unit and on an optical path of a real-world light field of a real-world environment, wherein the optical combiner is employed to reflect the light received from the optical element towards the first eye and the second eye of the at least one user, whilst optically combining said light with the real-world light field, wherein the at least one processor is configured to:

determine an intensity of a part of the real-world light field passing through a part of the optical combiner from which the first light emanating from the first photo-emitting cell and the third light emanating from the third photo-emitting cell pass towards the first eye;

detect when the intensity of the part of the real-world light field passing through the part of the optical combiner is lower than the first output intensity value of the given 3D point; and when it is detected that the intensity of said part of the real-world light field is lower than the first output intensity value of the given 3D point, adjust the first intensity value of the first pixel and the third intensity value of the third pixel, based on a difference between the first output intensity value of the given 3D point and the intensity of said part of the real-world light field.

10. The system of claim 6, wherein the at least one processor is configured to control the optical element by:

controlling another first part of the optical element upon which the first light emanating from the first photo-emitting cell of the second display region is incident, to re-direct the first light towards the second eye of the at least one user, based on the relative location of the second eye with respect to the optical element;

controlling another second part of the optical element upon which the second light emanating from the second photo-emitting cell of the second display region is incident, to re-direct the second light towards the first eye of the at least one user, based on the relative location of the first eye with respect to the optical element; and controlling the another first part and the another second part of the optical element to allow fourth light emanating from a fourth photo-emitting cell of the first display region to be directed towards the first eye and the second eye, respectively, without bending.

11. The system of claim 7, wherein another first part of the optical element is employed to re-direct the first light emanating from the first photo-emitting cell of the second display region towards the second eye of the at least one user, and another second part of the optical element is employed to re-direct the second light emanating from the second photo-emitting cell of the second display region towards the first eye of the at least one user, wherein the another first part and the another second part of the optical element are employed to allow fourth light emanating from a fourth photo-emitting cell of the first display region to be directed towards the first eye and the second eye, respectively, without bending.

12. The system of claim 10, wherein a first pixel, a second pixel, a third pixel and a fourth pixel of the at least one image correspond to the first photo-emitting cell, the second photo-emitting cell, the third photo-emitting cell and the fourth photo-emitting cell, wherein when generating the at least one image, the at least one processor is configured to generate a first intensity value, a second intensity value, a third intensity value and a fourth intensity value for the first pixel, the second pixel, the third pixel and the fourth pixel of the at least one image, respectively, based on a first output intensity value and a second output intensity value of a given 3D point in the first virtual image and the second virtual image, respectively, and a first output intensity value and a second output intensity value of another given 3D point in the first virtual image and the second virtual image, respectively, wherein the given 3D point corresponds to the first part and the second part of the optical element, while the another given 3D point corresponds to the another first part and the another second part of the optical element.

13. The system of claim 12, further comprising gaze-tracking means, wherein the at least one processor is configured to:

utilise the gaze-tracking means to determine gaze directions of the eyes of the at least one user;

detect when the first part and the second part of the optical element correspond to the gaze directions of the eyes of the at least one user, but the another first part and the another second part of the optical element do not correspond to the gaze directions of the eyes of the at least one user; and when it is detected that the first part and the second part of the optical element correspond to the gaze directions, but the another first part and the another second part of the optical element do not correspond to the gaze directions, prioritise minimising a visual error in output intensity values produced for the given 3D point over output intensity values produced for the another given 3D point.

14. The system of claim 1, further comprising an optical combiner arranged on the optical path of the display unit and on an optical path of a real-world light field of a real-world environment, wherein the optical combiner is employed to reflect the light received from the optical element towards the first eye and the second eye of the at least one user, whilst optically combining said light with the real-world light field, wherein the at least one processor is configured to:

determine intensities of different parts of the real-world light field passing through the optical combiner towards a given eye;

detect when an intensity of a given part of the real-world light field passing through a given part of the optical combiner towards the given eye is greater than a predefined threshold intensity; and when it is detected the intensity of the given part of the real-world light field passing through the given part of the optical combiner towards the given eye is greater than the predefined threshold intensity, dim pixels of the first display region and the second display region on whose optical path the given part of the optical combiner lies.

15. A method comprising:

utilising tracking means to determine a relative location of a first eye and of a second eye of at least one user with respect to an optical element, the optical element being arranged on an optical path of a display unit comprising a first display region and a second display region, the optical element being made of any one of: (i) a birefringent material, (ii) a metamaterial;

obtaining a first virtual image and a second virtual image to be presented to the first eye and the second eye of the at least one user, respectively, based on the relative location of the first eye and of the second eye of the at least one user with respect to the optical element;

generating at least one image to be employed at the display unit, based on the first virtual image, the second virtual image, the relative location of the first eye and of the second eye of the at least one user with respect to the optical element, and a relative location of the optical element with respect to the first display region and the second display region; and displaying the at least one image via the display unit, wherein the optical element is employed to re-direct light emanating from photo-emitting cells on the second display region to bend towards the first eye and the second eye of the at least one user, while allowing light emanating from photo-emitting cells on the first display region to be incident upon the first eye and the second eye of the at least one user without bending.

16. The method of claim 15, wherein when the optical element is made of the birefringent material, the birefringent material comprises a liquid crystal material, wherein the method further comprises controlling the optical element by controlling a refractive index of the liquid crystal material in a given part of the optical element, based on an incidence angle of light emanating from a given group of photo-sensitive cells of the second display region being incident upon the given part of the optical element and a refraction angle of the light after being re-directed by the given part of the optical element towards a given eye of the at least one user.

17. The method of claim 15, wherein when the optical element is made of the metamaterial, the optical element is semi-transparent and comprises micromirrors, wherein the method further comprises controlling the optical element by controlling an orientation of a given micromirror, based on an incidence angle of light emanating from a given group of photo-sensitive cells of the second display region being incident upon the optical element and a refraction angle of the light after being re-directed by the given mirror towards a given eye of the at least one user.

18. The method of claim 16, further comprising controlling the optical element by:

controlling a first part of the optical element upon which first light emanating from a first photo-emitting cell of the second display region is incident, to re-direct the first light towards the first eye of the at least one user, based on the relative location of the first eye with respect to the optical element;

controlling a second part of the optical element upon which second light emanating from a second photo-emitting cell of the second display region is incident, to re-direct the second light towards the second eye of the at least one user, based on the relative location of the second eye with respect to the optical element; and controlling the first part and the second part of the optical element to allow third light emanating from a third photo-emitting cell of the first display region to be directed towards the first eye and the second eye, respectively, without bending.

19. The method of claim 18, wherein a first pixel, a second pixel and a third pixel of the at least one image correspond to the first photo-emitting cell, the second photo-emitting cell, and the third photo-emitting cell, wherein the step of generating the at least one image comprises generating a first intensity value, a second intensity value and a third intensity value for the first pixel, the second pixel and the third pixel of the at least one image, respectively, based on a first output intensity value and a second output intensity value of a given 3D point in the first virtual image and the second virtual image, respectively.

20. The method of claim 19, wherein an optical combiner is arranged on the optical path of the display unit and on an optical path of a real-world light field of a real-world environment, wherein the optical combiner is employed to reflect the light received from the optical element towards the first eye and the second eye of the at least one user, whilst optically combining said light with the real-world light field, wherein the method further comprises:

determining an intensity of a part of the real-world light field passing through a part of the optical combiner from which the first light emanating from the first photo-emitting cell and the third light emanating from the third photo-emitting cell pass towards the first eye;

detecting when the intensity of the part of the real-world light field passing through the part of the optical combiner is lower than the first output intensity value of the given 3D point; and when it is detected that the intensity of said part of the real-world light field is lower than the first output intensity value of the given 3D point, adjusting the first intensity value of the first pixel and the third intensity value of the third pixel, based on a difference between the first output intensity value of the given 3D point and the intensity of said part of the real-world light field.

* * * * *